(12) United States Patent
Ramasamy et al.

(10) Patent No.: US 10,630,782 B2
(45) Date of Patent: Apr. 21, 2020

(54) LIGHT-WEIGHT WEB BROWSER SUPPORT FOR THIN CLIENT SOLUTION

(71) Applicant: AMZETTA TECHNOLOGIES, LLC, Norcross, GA (US)

(72) Inventors: Veerajothi Ramasamy, Duluth, GA (US); Jayachandran Gnanasekaran, Duluth, GA (US); Varadachari Sudan Ayanam, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 129 days.

(21) Appl. No.: 15/642,493

(22) Filed: Jul. 6, 2017

(65) Prior Publication Data
US 2019/0014181 A1 Jan. 10, 2019

(51) Int. Cl.
*H04L 29/08* (2006.01)
*H04L 12/24* (2006.01)
*H04L 29/14* (2006.01)
*G06F 9/455* (2018.01)

(52) U.S. Cl.
CPC ............ *H04L 67/141* (2013.01); *H04L 41/06* (2013.01); *H04L 67/02* (2013.01); *H04L 67/025* (2013.01); *H04L 69/40* (2013.01); *G06F 9/45545* (2013.01); *G06F 9/45558* (2013.01)

(58) Field of Classification Search
CPC ....... H04L 67/02; H04L 67/141; H04L 41/06; H04L 69/40; G06F 9/4554; G06F 9/45558
See application file for complete search history.

(56) References Cited

U.S. PATENT DOCUMENTS

| 7,587,669 B2 * | 9/2009 | Rana .................. G06F 17/2235 715/242 |
| 2015/0169206 A1 * | 6/2015 | Balakrishnan ...... G06F 3/04847 715/740 |

OTHER PUBLICATIONS

Nieh et al. "A Comparison of Thin-Client Computing Architectures". Technical Report CUCS-022-00. Network Computing Laboratory. Columbia University. pp. 1-16 (Year: 2000).*

* cited by examiner

*Primary Examiner* — John M MacIlwinen
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client includes a storage device that is limited to store programs for establishing a remote session with a remote machine and a web browser. The thin client detects a communication failure in establishing the remote session with the remote machine. The thin client launches the web browser. The thin client connects with a first web site via the web browser.

20 Claims, 8 Drawing Sheets

LIGHT-WEIGHT WEB BROWSER SUPPORT FOR THIN CLIENT SOLUTION

BACKGROUND

Field

The present disclosure relates generally to networked computer systems, and more particularly, to techniques of utilizing a light-weight web browser on a thin client.

Background

The statements in this section merely provide background information related to the present disclosure and may not constitute prior art.

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client includes a storage device that is limited to store programs for establishing a remote session with a remote machine and a web browser. The thin client detects a communication failure in establishing the remote session with the remote machine. The thin client launches the web browser. The thin client connects with a first web site via the web browser.

DETAILED DESCRIPTION

Figure 1:
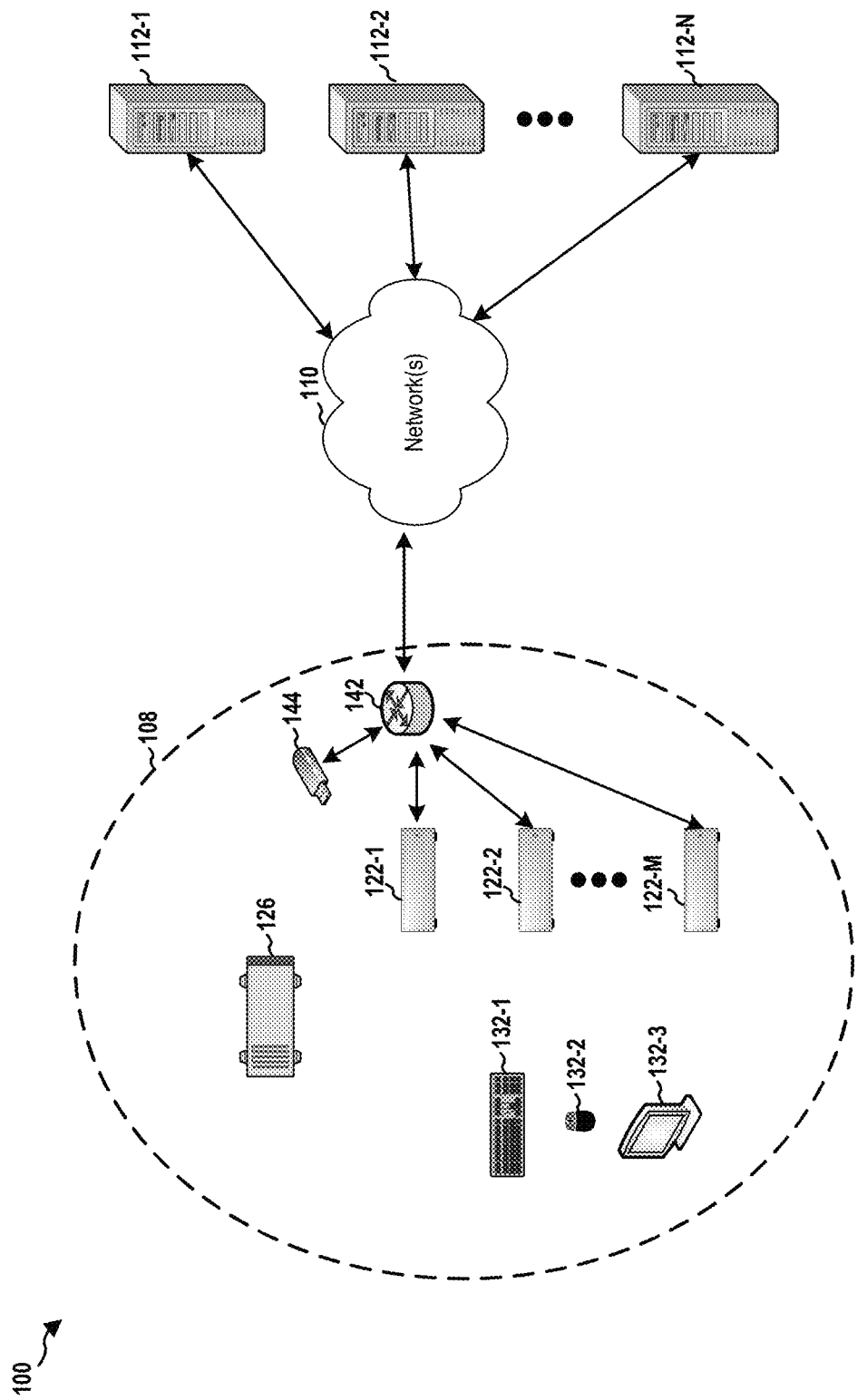
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

d—A thin client (or zero client) is a lightweight desktop computer that may not have a user usable storage device such as a hard drive. The thin client can be a small device with minimal requirement for hardware such as Keyboard, mouse, monitor, USB port and Ethernet card. The thin client is built for virtualization technology and the major role of the thin client is to provide desktop experience to users via remote access protocol. Thin client platforms are useful in different environments such as education environments, health care environments, gaming environments, and advertisement environments, etc.

Most of the organizations host an Intranet and CMS (Content Management System) websites for the ease access of employees. The Intranet and CMS websites may act as an access point for accessing organization oriented collaborative information database, raising work based request, reporting problems, etc.

When thin clients are deployed as replacements of desktop computers, in certain configurations, users may have to rely on a remote session (e.g., on a virtual machine) to access intranet specific websites. In case of any disruption in Virtual desktop infrastructure (VDI) services, thin client users may not have any access or means of communication to interact with Intranet and CMS website, as the users' access may be restricted only with hosted virtual machines in the VDI solution.

FIG. 1 is a diagram 100 illustrating networked thin clients and remote machines. One or more of M thin clients 122-1, 122-2, ..., 122-M each may be utilized to establish a respective session with one or more of N remote machines 112-1, 112-2, ..., 112-N, M and N each being a respective integer greater than 0. In certain configurations, the thin clients 122-1, 122-2, ..., 122-M may be in communication with the remote machines 112-1, 112-2, ..., 112-N through a network 110 (e.g., Internet). Each of the remote machines 112-1, 112-2, ..., 112-N may be a virtual machine or a physical machine. Each of the thin clients 122-1, 122-2, ..., 122-M may be wirelessly connected with one or more peripherals, e.g., peripherals 132-1, 132-2, 132-3.

Further, a remote machine manager 126 may be utilized to manage the thin clients 122-1, 122-2, ..., 122-M, the remote machines 112-1, 112-2, ..., 112-N, and/or the peripherals 132-1, 132-2, 132-3. The networked peripherals, the remote machine manager 126, and the thin clients 122-1, 122-2, ..., 122-M may be in the same LAN 108, e.g., a wireless local area network (WLAN) or a wired LAN. In certain configurations, those devices may be in a different type of network.

Figure 2:
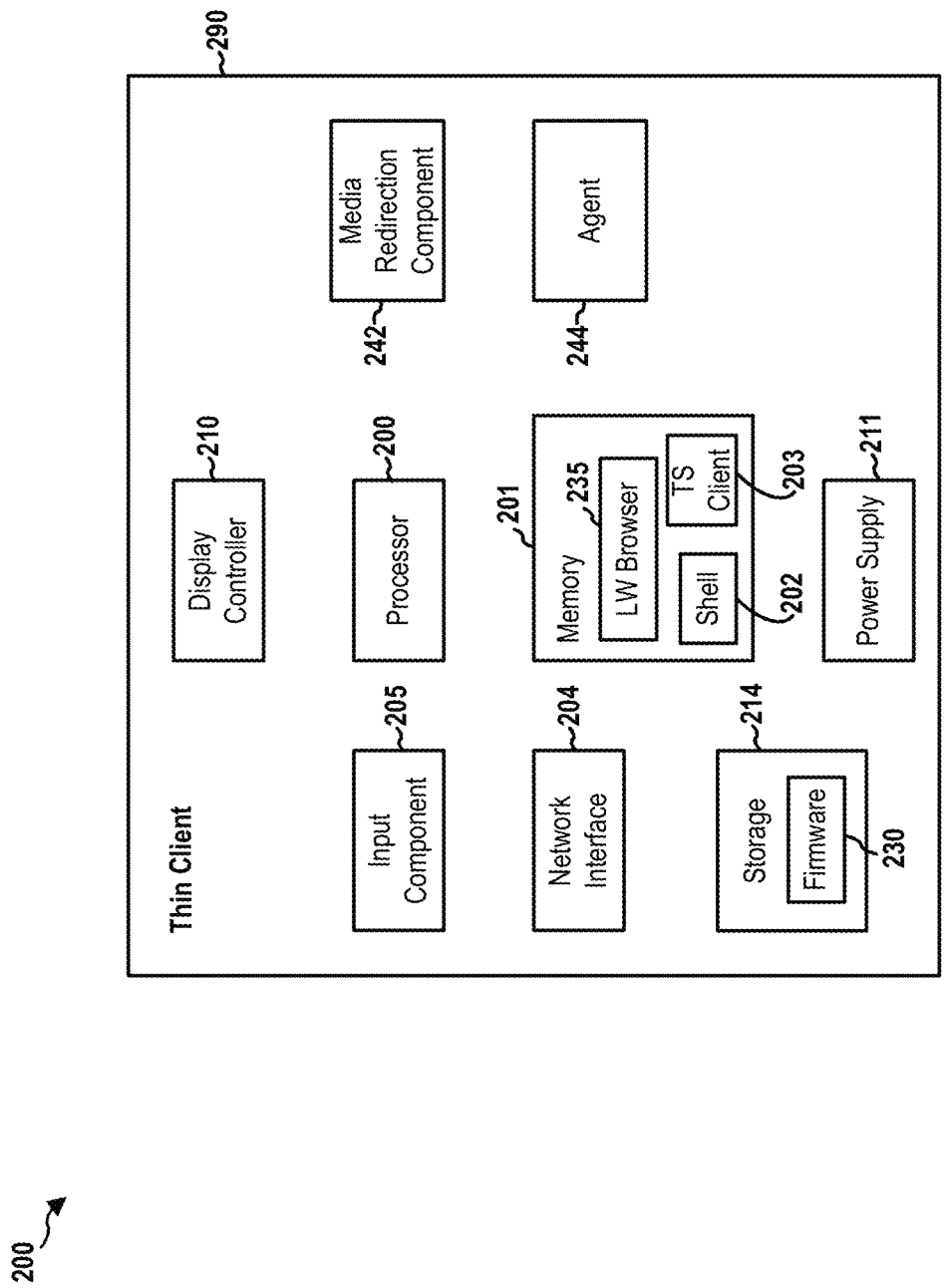
FIG. 2 is a diagram illustrating an exemplary thin client.

FIG. 2 is a diagram 200 illustrating an exemplary thin client. A thin client 290, which may be any one of the thin clients 122-1, 122-2, ..., 122-M, includes one or more processors 200, which can be microprocessors, controllers or any other suitable type of processors for processing computing executable instructions to control the operation of the device. The computer executable instructions can be provided using any computer-readable media, such as memory 201. The memory 201 is of any suitable type such as random access memory (RAM). The thin client 290 may also include a storage component 214, which may be a storage device of any type such as a magnetic or optical storage device, a hard disk drive, a CD, DVD, or other disc drive, a flash memory, an EPROM, or an EEPROM.

The thin client 290 may store firmware 230 in the storage component 214. When the processor 200 executes the firmware 230, the processor 200 loads code and data of the firmware 230 into the memory 201. This example shows that the firmware 230 provides in the memory 201, among other components, a software shell 202, a terminal server (TS) client 203 application, and a light-weight web browser 235, which are described in more detail infra.

A network interface 204 enables the thin client 290 to communicate over a network (in particular a wireless network) with the remote machines 112-1, 112-2, ..., 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
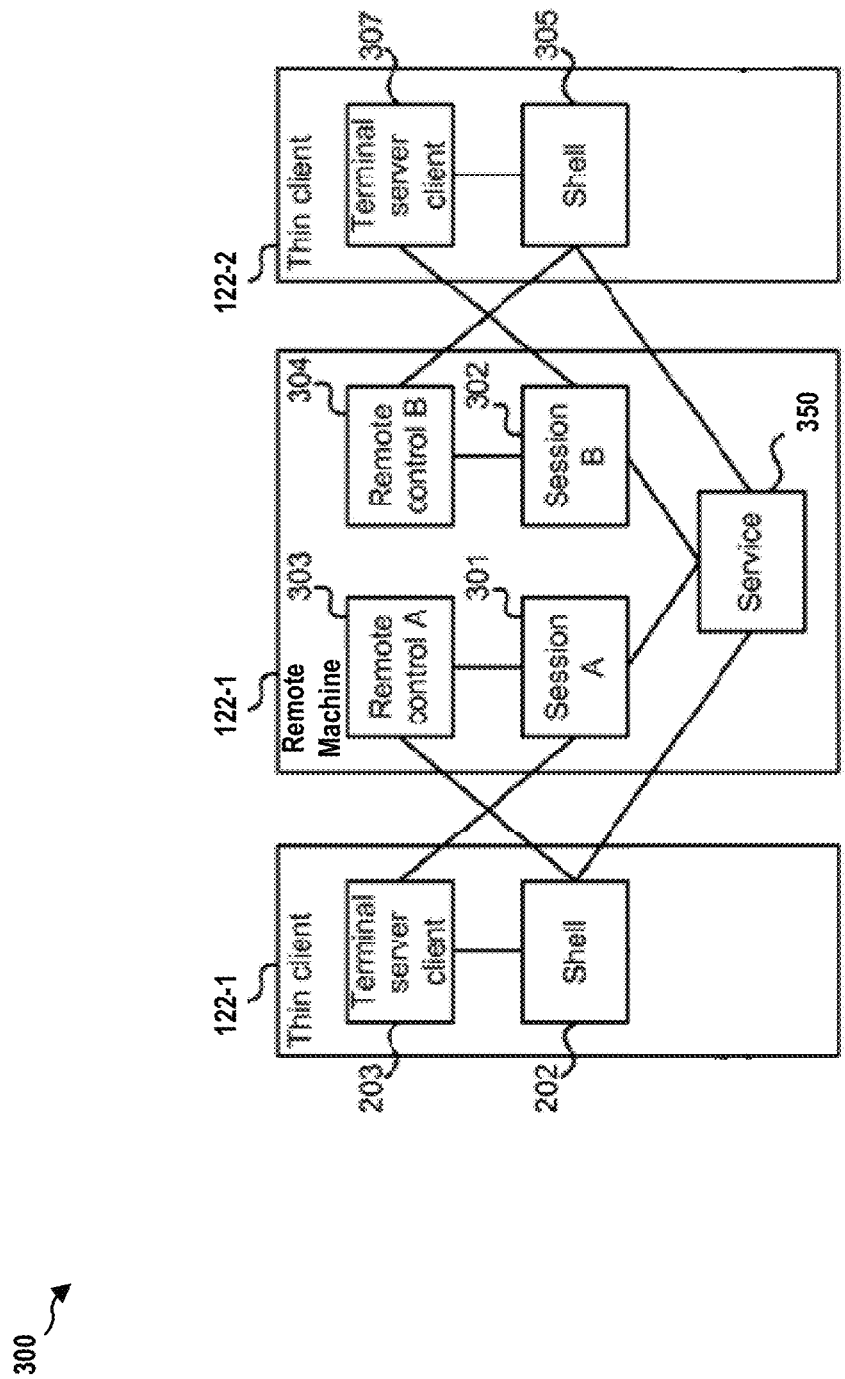
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also, note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
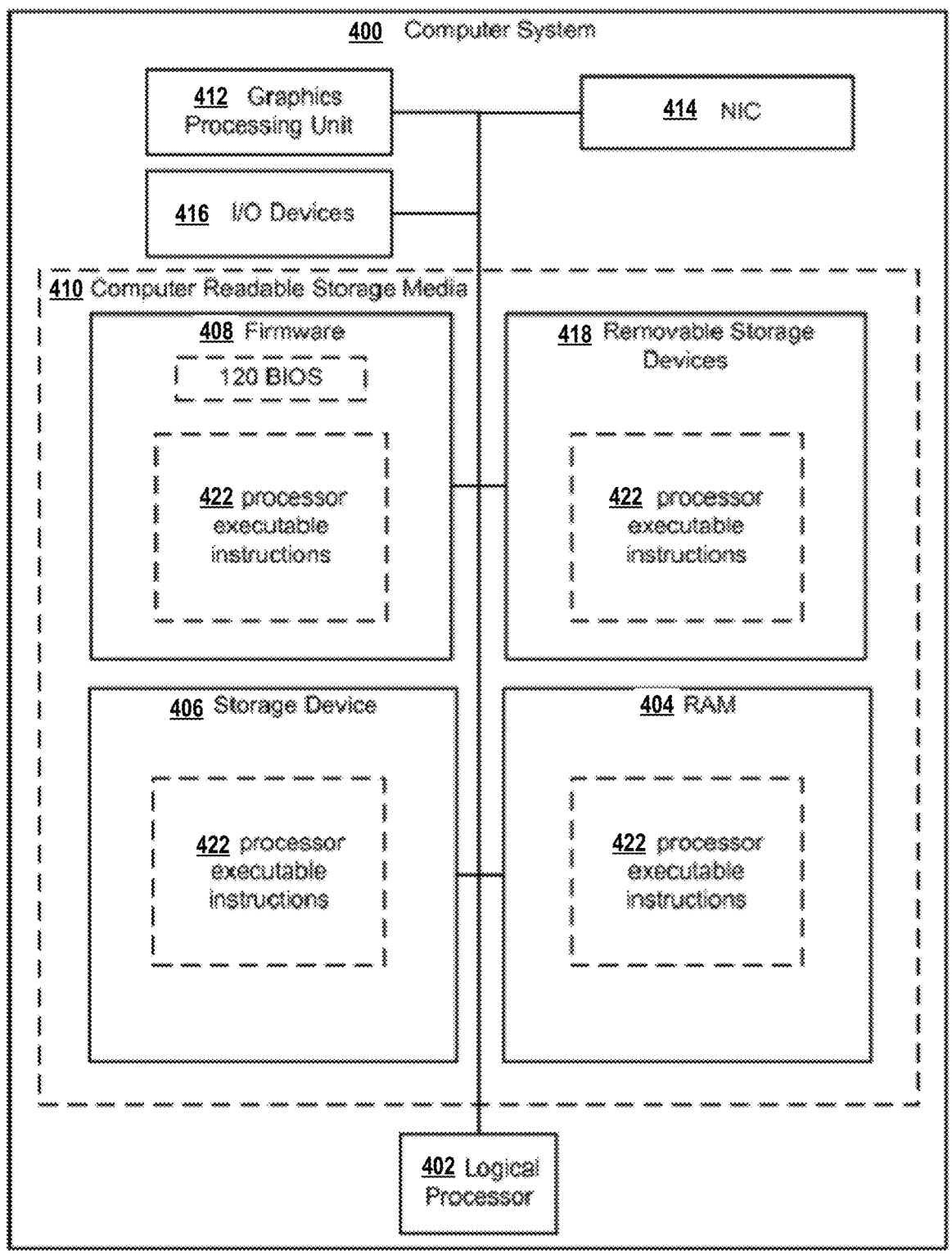
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments, the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
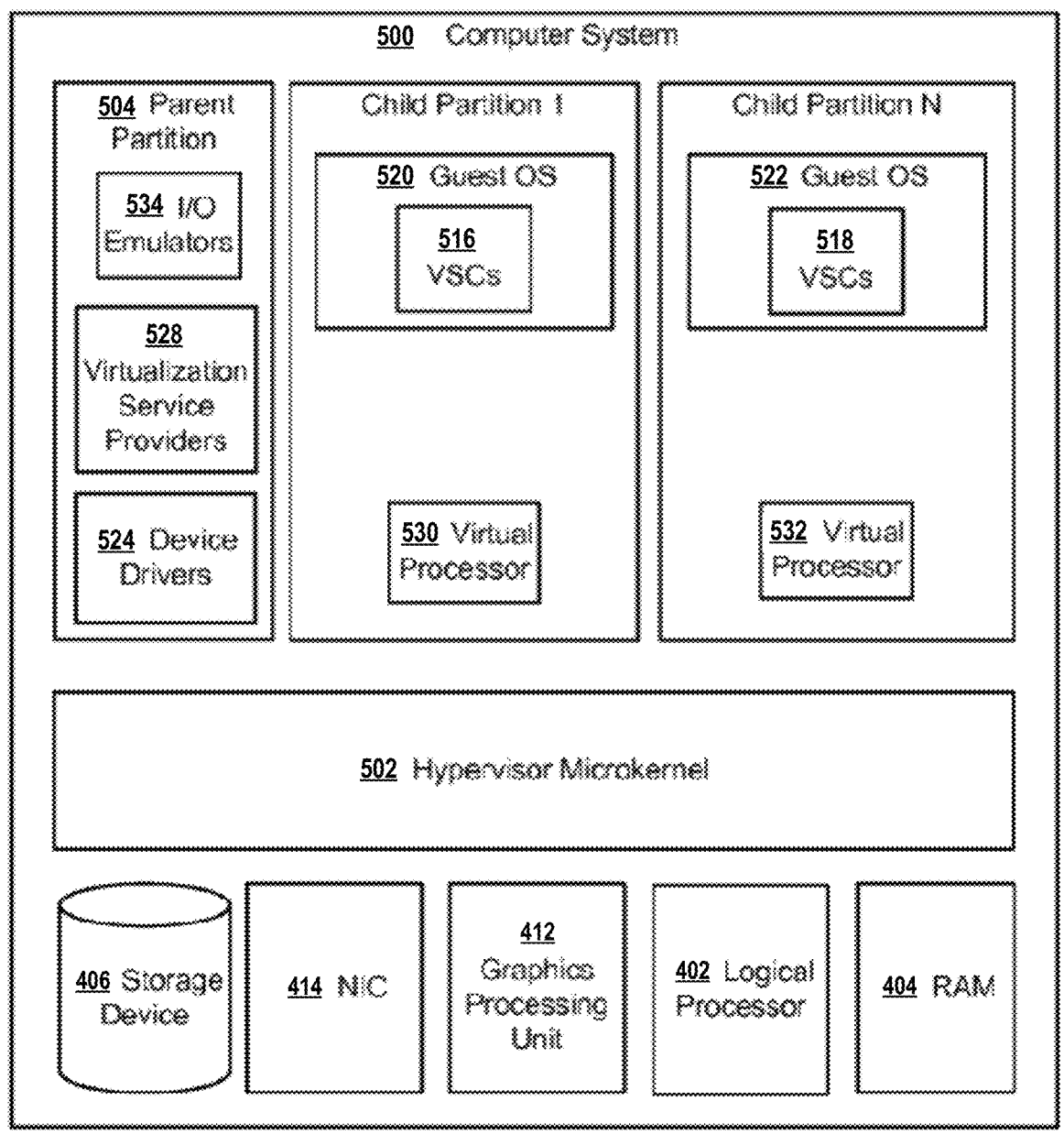
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as backend drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
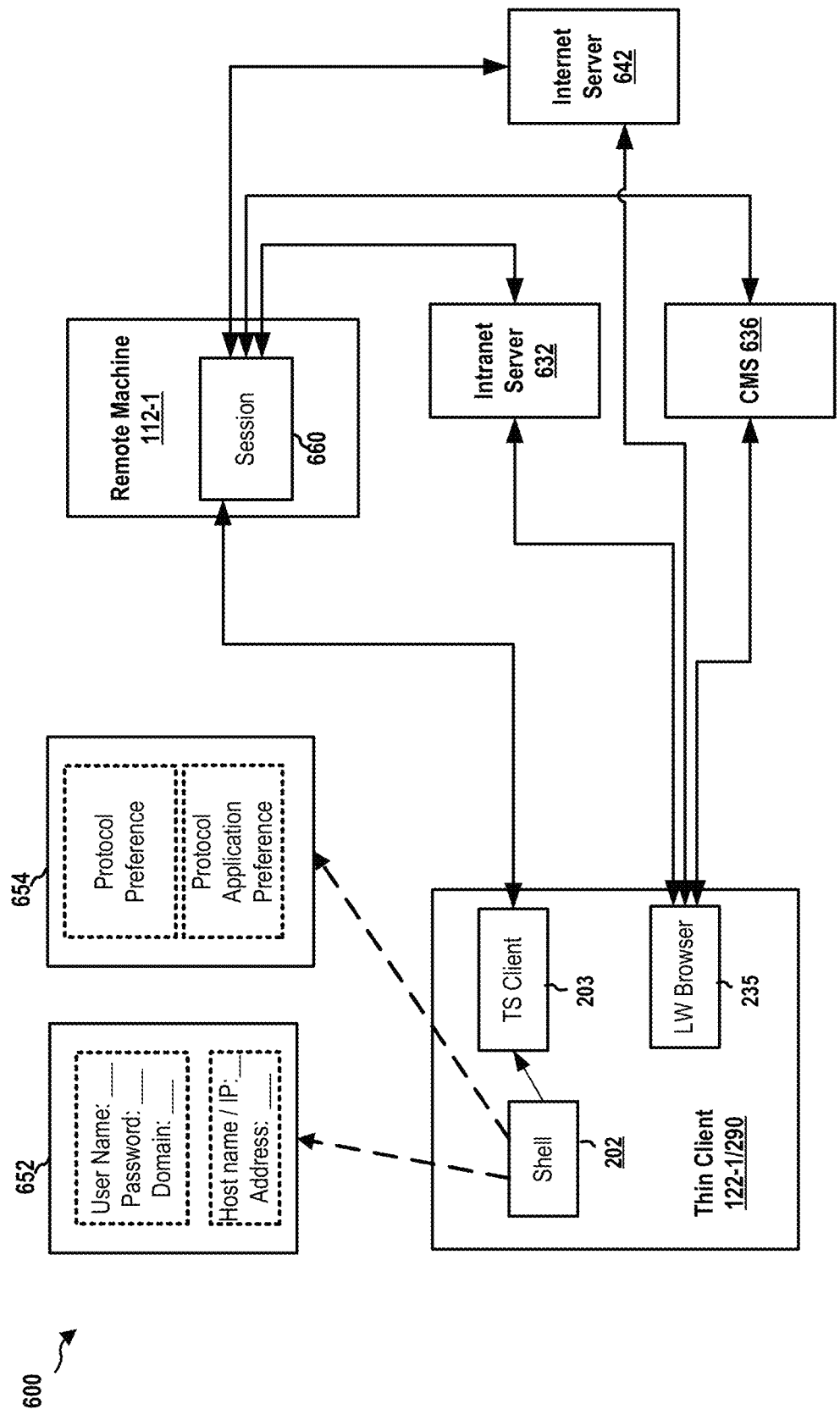
FIG. 6 is a diagram illustrating communication between a thin client and remote machine.

FIG. 6 is a diagram 600 illustrating communication between a thin client, a remote machine, an intranet server 632, a content management system (CMS) server 636, and an internet server 642. Although FIG. 6 shows the thin client 122-1/thin client 290 and the remote machine 112-1, the thin client may be any of the thin clients 122-1, 122-2, . . . , 122-M and the remote machine may be any of the remote machines 112-1, 112-2, . . . , 112-N. In this example, the storage component 214 of the thin client 122-1 is limited to store the firmware 230 and may not provide any space for user programs' use. The firmware 230 may only include programs (e.g., the shell 202 and the TS client 203) for establishing a remote session with a remote machine (e.g., the remote machine 112-1) and the light-weight web browser 235. The storage component 214 may be a flash drive. As such, a user of the thin client 122-1 may not store any data in the thin client 122-1 other than through the shell 202, the TS client 203, and the light-weight web browser 235. In particular, the light-weight web browser 235 is light-weight in the sense that, during execution, the light-weight web browser 235 uses less than 5, 10, or 20 Megabytes of space of a memory of the thin client.

Most organizations host an intranet and CMS websites for ease of access by their employees. The intranet and the CMS websites act as access points for organization oriented collaborative information database, which may raise work based requests, report problems, etc. When thin clients are deployed as replacements of desktop computers, the thin clients have access to virtual machines (e.g., to perform intended duties), access to intranet specific websites, access to Internet, etc.

In a VDI environment, thin clients can access Internet and an intranet via remote sessions. In case of a disruption of the VDI service, the thin clients may lose their communication to the intranet and the CMS websites established through the remote sessions.

As described infra, a thin client can employ the light-weight web browser 235 to access Internet or the intranet without logging in to the VDI setup. This may reduce the server load of the VDI service. Further, the light-weight web browser 235 can also enable the thin client to access Internet, the intranet, and the CMS websites when there is a disruption to the VDI service.

In certain configurations, the shell 202 (e.g., a launcher) launch the TS client 203. The TS client 203 may present an interface 652 to a user of the thin client 122-1. The interface 652 may prompt the user to enter credentials (e.g., user name and password) that can be used to establish a session with the remote machine 112-1. The interface 652 may further ask the user to input a domain associated with the credentials. In certain configurations, the interface 652 may prompt the user to input an identifier (e.g., host name, IP address etc.) of a remote machine that the user wants to connect to. For example, the user may input the IP address of the remote machine 112-1. Based on the above information, the TS client 203 may attempt to establish a remote session 660 with the remote machine 112-1 through a remote session protocol such as remote desktop protocol (RDP), HDX protocol, PC over IP (PCoIP) protocol, or virtual network computing (VNC) protocol. Upon establishing the remote session 660 with the remote machine 112-1, the thin client 122-1 may visit the intranet server 632, the CMS server 636, and the internet server 642 by utilizing the remote machine 112-1.

In certain circumstances, the thin client 122-1 may experience a communication failure with the remote machine 112-1. For example, the communication failure may be due to that a user of the thin client 122-1 has failed to provide credentials for initiating the remote session 660. The communication failure may be due to that the remote machine 112-1 has failed to boot. The communication failure may be due to that the shell 202 and/or the TS client 203 has failed to initiate.

Upon experiencing a communication failure, the firmware 230 may lunch the light-weight web browser 235 on the thin client 122-1 in order to provide network accessibility. As such, the light-weight web browser 235 is loaded into the memory 201 and is executed by the processor 200. The light-weight web browser 235 allows a user of the thin client 122-1 to access directly the intranet server 632, the CMS server 636, and/or the internet server 642 via a network. In certain configurations, the light-weight web browser 235 is configured to support the intranet server 632 and the CMS server 636. The intranet server 632 and the CMS server 636 may be internal web sites of an entity (e.g., a company). Accordingly, the utilized webpage formats or protocols as well as the system requirements of the intranet server 632 and the CMS server 636 are known. Accordingly, although the light-weight web browser 235 may have limited functionalities as it is light weight, the light-weight web browser 235 may be specifically configured to support the intranet server 632 and the CMS server 636. Further, the intranet server 632 and the CMS server 636 may be configured to be compatible with the capabilities (i.e., supported functionalities) of light-weight web browser 235.

Figure 7:
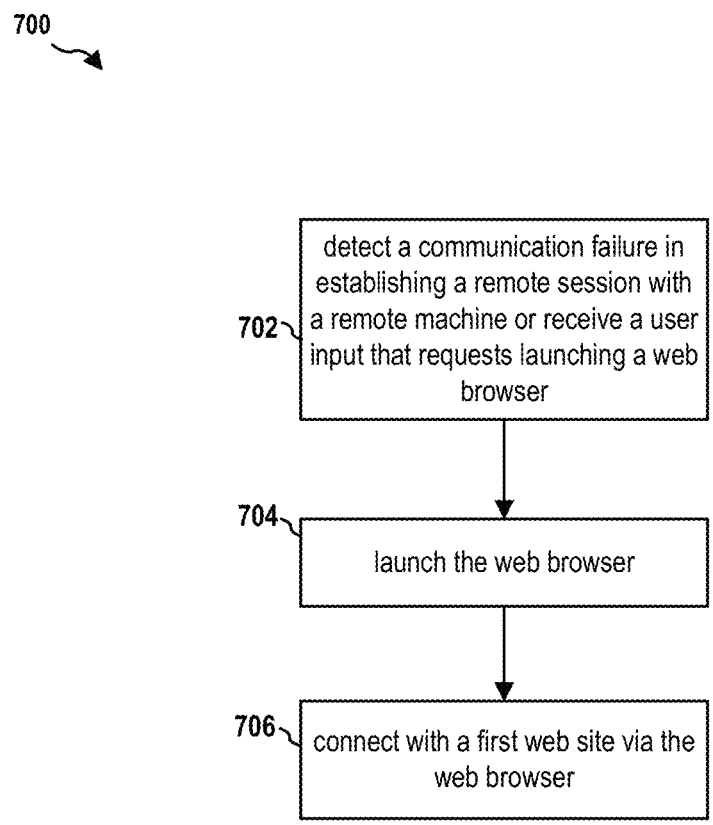
FIG. 7 is a flow chart of a method (process) for accessing a web site.

FIG. 7 is a flow chart 700 of a method (process) for accessing a web site. The method may be performed by a thin client (e.g., the thin client 122-1 and the apparatus 202/202'). At operation 702, the thin client detects a communication failure in establishing a remote session (e.g., the remote session 660) with a remote machine (e.g., the remote machine 112-1). The thin client has a storage device (e.g., the storage component 214) that is limited to store programs (e.g., the shell 202 and the TS client 203) for establishing the remote session and a web browser (e.g., the light-weight web browser 235). The web browser is configured to support one or more predetermined web sites (e.g., the intranet server 632, the CMS server 636, and the internet server 642). Further, in some scenarios, the thin client may receive a user input that requests the thin client to launch the web browser. At operation 704, the thin client launches the web browser. At operation 706, the thin client connects with a first web site (e.g., the intranet server 632) via the web browser.

In certain configurations, the first remote machine is a virtual machine. In certain configurations, the web browser is a light-weight web browser that uses, during execution, less than 20 Megabytes of space of a memory (e.g., the memory 201) of the thin client. In certain configurations, the first web site is an intranet web site (e.g., the intranet server 632) or an internal content management system web site (e.g., the CMS server 636) configured to be compatible with the web browser. In certain configurations, functionalities of the thin client are limited to operating the web browser and establishing the remote session. In certain configurations, the communication failure is due to at least one of a failure to provide credentials for initiating the remote session, a failure to boot the remote machine, and a failure to initiate the programs for establishing the remote session. In certain configurations, the programs for establishing the remote session include a terminal server client (e.g., the TS client 203).

Figure 8:
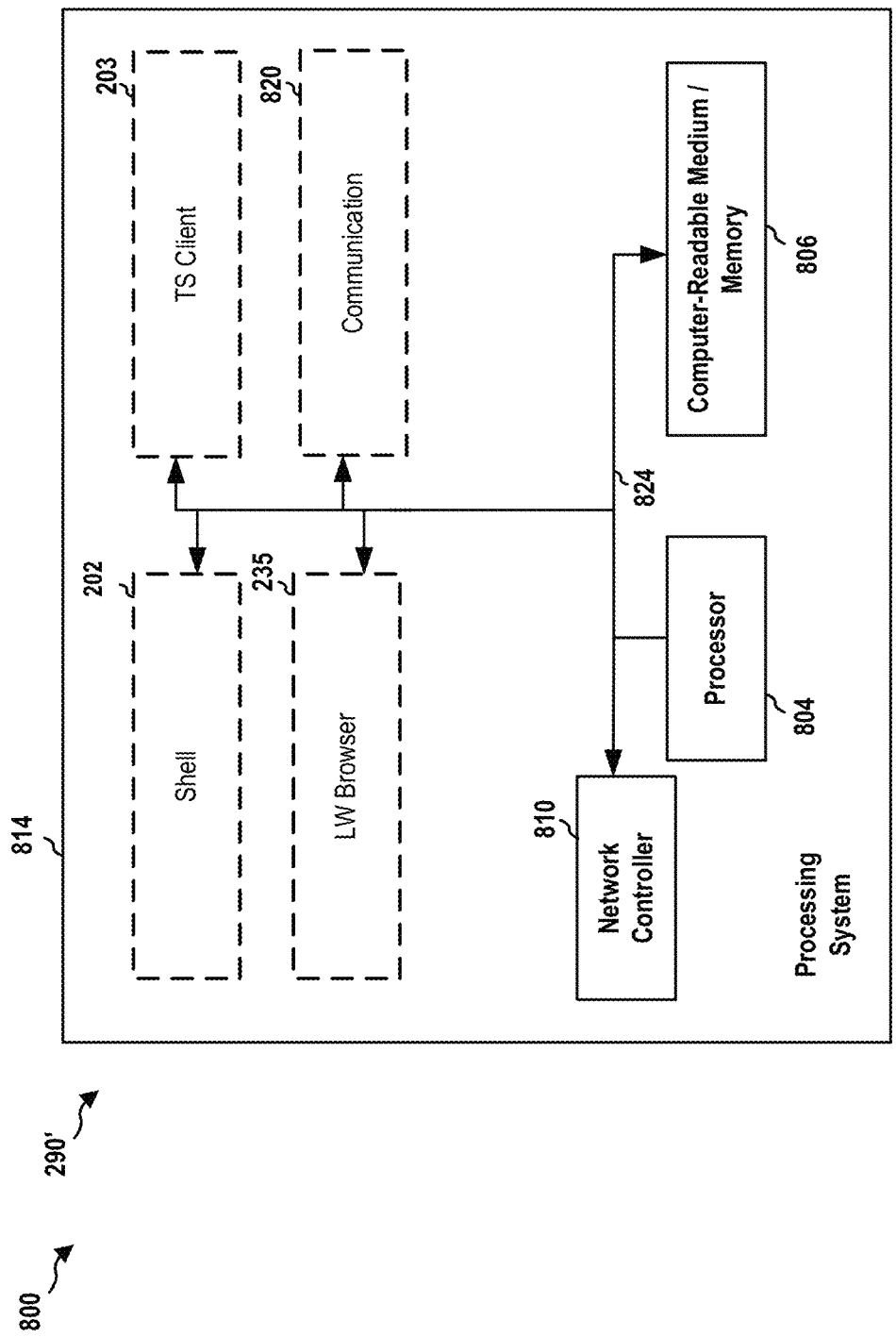
FIG. 8 is a diagram illustrating an example of a hardware implementation for an apparatus employing a processing system.

FIG. 8 is a diagram 800 illustrating an example of a hardware implementation for an apparatus 290' (e.g., the thin client 290) employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, including the processor 804 the computer-readable medium/memory 806, and the network controller 810. In particular, the computer-readable medium/memory 806 may include the memory 201 and the storage component 214. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 820. In addition, the network controller 810 receives information from the processing system 814, specifically the communication component 820, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the shell 202, the TS client 203, the light-weight web browser 235. The components may be software components running in the processor 804, resident/stored in the computer readable medium/memory 806, one or more hardware components coupled to the processor 804, or some combination thereof.

The apparatus 202/202' may be configured to include means for performing each of the operations described supra referring to FIG. 7. The aforementioned means may be one or more of the aforementioned components of the apparatus 290 and/or the processing system 814 of the apparatus 290' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
    establishing, at the thin client, a remote session with a remote machine;
    connecting, at the thin client, with a first web site via the remote session, wherein the remote machine communicates with the first web site through a network;
    detecting a communication failure in establishing the remote session with the remote machine, wherein the thin client has a storage device that is limited to store programs for establishing the remote session and a web browser;
    launching the web browser in response to detecting the communication failure; and
    connecting with the first web site via the web browser without connecting through the remote machine.

2. The method of claim 1, wherein the web browser is configured to support one or more predetermined web sites, wherein the one or more predetermined web sites include the first web site.

3. The method of claim 1, wherein the remote machine is a virtual machine.

4. The method of claim 1, wherein the web browser is a light-weight web browser that uses, during execution, less than 20 Megabytes of space of a memory of the thin client.

5. The method of claim 1, wherein the first web site is an intra-net web site or an internal content management system web site configured to be compatible with the web browser.

6. The method of claim 1, wherein functionalities of the thin client are limited to operating the web browser and establishing the remote session.

7. The method of claim 1, wherein the communication failure is due to at least one of a failure to provide credentials for initiating the remote session, a failure to boot the remote machine, and a failure to initiate the programs for establishing the remote session.

8. The method of claim 1, wherein the programs for establishing the remote session include a terminal server client.

9. An apparatus, the apparatus being a thin client, comprising:
    a storage device that is limited to store programs for establishing a remote session with a remote machine and a web browser, wherein the remote machine communicates with the first web site through a network;
    a memory; and
    at least one processor coupled to the memory and configured to:
        establish, at the thin client, a remote session with a remote machine;
        connect, at the thin client, with a first web site via the remote session;
        detect a communication failure in establishing the remote session with the remote machine,
        launch the web browser in response to detecting the communication failure; and
        connect with the first web site via the web browser without connecting through the remote machine.

10. The apparatus of claim 9, wherein the web browser is configured to support one or more predetermined web sites, wherein the one or more predetermined web sites include the first web site.

11. The apparatus of claim 9, wherein the remote machine is a virtual machine.

12. The apparatus of claim 9, wherein the web browser is a light-weight web browser that uses, during execution, less than 20 Megabytes of space of a memory of the thin client.

13. The apparatus of claim 9, wherein the first web site is an intra-net web site or an internal content management system web site configured to be compatible with the web browser.

14. The apparatus of claim 9, wherein functionalities of the thin client are limited to operating the web browser and establishing the remote session.

15. The apparatus of claim 9, wherein the communication failure is due to at least one of a failure to provide credentials for initiating the remote session, a failure to boot the remote machine, and a failure to initiate the programs for establishing the remote session.

16. The apparatus of claim 9, wherein the programs for establishing the remote session include a terminal server client.

17. A non-transitory computer-readable medium storing computer executable code for operating a thin client, comprising code to:
    establish, at the thin client, a remote session with a remote machine;
    connect, at the thin client, with a first web site via the remote session, wherein the remote machine communicates with the first web site through a network;
    detect a communication failure in establishing the remote session with the remote machine, wherein the thin client has a storage device that is limited to store programs for establishing the remote session and a web browser;

launch the web browser in response to detecting the communication failure; and connect with the first web site via the web browser without connecting through the remote machine.

18. The non-transitory computer-readable medium of claim 17, wherein the web browser is configured to support one or more predetermined web sites, wherein the one or more predetermined web sites include the first web site.

19. The non-transitory computer-readable medium of claim 17, wherein the remote machine is a virtual machine.

20. The non-transitory computer-readable medium of claim 17, wherein the web browser is a light-weight web browser that uses, during execution, less than 20 Megabytes of space of a memory of the thin client.

\* \* \* \* \*